United States Patent
Scapa et al.

(10) Patent No.: US 10,387,539 B2
(45) Date of Patent: Aug. 20, 2019

(54) DIGITAL CARD MANAGEMENT WITH STYLE-BASED DYNAMIC CARD GENERATION

(71) Applicant: Altair Engineering, Inc., Troy, MI (US)

(72) Inventors: James R. Scapa, West Bloomfield, MI (US); Srikanth Mahalingam, Troy, MI (US)

(73) Assignee: Altair Engineering, Inc., Troy, MI (US)

( * ) Notice: Subject to any disclaimer, the term of this patent is extended or adjusted under 35 U.S.C. 154(b) by 0 days.

(21) Appl. No.: 15/623,159

(22) Filed: Jun. 14, 2017

(65) Prior Publication Data

US 2017/0364481 A1 Dec. 21, 2017

Related U.S. Application Data

(60) Provisional application No. 62/350,491, filed on Jun. 15, 2016.

(51) Int. Cl.
| | |
|---|---|
| *H04W 4/21* | (2018.01) |
| *G06F 17/21* | (2006.01) |
| *G06Q 10/10* | (2012.01) |
| *H04L 12/58* | (2006.01) |
| *H04L 29/08* | (2006.01) |
| *H04L 29/12* | (2006.01) |
| *H04M 3/493* | (2006.01) |

(Continued)

(52) U.S. Cl.
CPC ......... *G06F 17/211* (2013.01); *G06Q 10/109* (2013.01); *H04L 51/10* (2013.01);
(Continued)

(58) Field of Classification Search
None
See application file for complete search history.

(56) References Cited

U.S. PATENT DOCUMENTS

| 9,646,329 B2 * | 5/2017 | Romes .............. G06Q 30/0276 |
| 2003/0066877 A1 * | 4/2003 | Howard ................. G06Q 30/06 235/380 |

(Continued)

FOREIGN PATENT DOCUMENTS

WO WO 2017/218676 A1 12/2017

OTHER PUBLICATIONS

International Search Report and Written Opinion for Int. App No. PCT/US2017/037489, dated Oct. 17, 2017 (14 pages).

*Primary Examiner* — Asher D Kells
(74) *Attorney, Agent, or Firm* — Fish & Richardson P.C.

(57) ABSTRACT

Techniques are described for managing the generation, style, and/or distribution of digital contact cards. An organization may access a card management platform and upload style information for digital contact card(s). Style information may include an arrangement and/or layout of the card(s), an organization name and/or logo to be included on the card(s), the font, color, size, or other characteristics of the text on the card(s), and so forth. A user may access the platform to request the distribution of a digital contact card to recipient(s). In response to the request, the platform may generate a digital contact card for the user based on the previously specified style information, and distribute card(s) to the specified recipient(s). Techniques are also described for determining positions of various mobile devices (and associated users) in a room or other area, and presenting received contact card information in a user interface according to the determined positions.

20 Claims, 11 Drawing Sheets

(51) Int. Cl.
H04W 12/00 (2009.01)
G06F 3/0482 (2013.01)

(52) U.S. Cl.
CPC .............. H04L 51/28 (2013.01); H04L 67/10 (2013.01); H04L 67/306 (2013.01); H04M 3/4931 (2013.01); H04W 4/21 (2018.02); H04W 12/00 (2013.01); *G06F 3/0482* (2013.01); *H04L 51/08* (2013.01); *H04L 61/1594* (2013.01); *H04M 2203/554* (2013.01); *H04M 2203/558* (2013.01)

(56) References Cited

U.S. PATENT DOCUMENTS

| | | | |
|---|---|---|---|
| 2006/0065708 A1 | 3/2006 | Kanatani et al. | |
| 2006/0293903 A1* | 12/2006 | Ramanathan | G06Q 10/10 709/206 |
| 2006/0293904 A1* | 12/2006 | Ramanathan | G06Q 10/00 709/206 |
| 2006/0293905 A1* | 12/2006 | Ramanathan | G06Q 10/10 709/206 |
| 2012/0035992 A1* | 2/2012 | Tanaka | G06Q 30/0241 705/14.4 |
| 2014/0064694 A1* | 3/2014 | Zealer | H04N 5/76 386/230 |
| 2014/0108289 A1 | 4/2014 | Eitan et al. | |
| 2014/0149518 A1* | 5/2014 | Zhao | H04L 51/32 709/206 |
| 2015/0100868 A1* | 4/2015 | Moore | G06F 17/2235 715/205 |
| 2015/0254578 A1* | 9/2015 | Chi | G06Q 10/00 705/342 |
| 2015/0358775 A1 | 12/2015 | Cronin | |
| 2016/0371736 A1* | 12/2016 | Turner | G06Q 30/0267 |

* cited by examiner

DIGITAL CARD MANAGEMENT WITH STYLE-BASED DYNAMIC CARD GENERATION

CROSS-REFERENCE TO RELATED APPLICATION

The present disclosure is related to, and claims priority to, U.S. Provisional Patent Application Ser. No. 62/350,491, titled "Digital Card Management," which was filed on Jun. 15, 2016, and entirety of which is incorporated by reference into the present disclosure.

BACKGROUND

Traditionally, individuals at a meeting, conference, or other gathering may exchange cards that indicate each individual's name, company or organizational affiliation, title, contact information, and so forth. Individuals who attend many conferences and/or meetings may collect a large number of cards which may be difficult to carry, store, and/or organize. If an individual attempts to manage the cards they collect, such management is typically through the use of rolodexes, filing cabinets, or other mechanisms that may have limited utility and/or capacity. Accordingly, in many instances an individual's collected cards may eventually be discarded. Moreover, an organization may incur a heavy cost due to the printing of large numbers of cards to be used by the individuals in the organization.

SUMMARY

Implementations of the present disclosure are generally directed to management of digital contact cards for one or more individuals. More specifically, implementations are directed to generating and sending digital contact cards that include contact information for an individual as well as updateable style information for an organization. Implementations are also directed to determining a location or position of various mobile devices (and associated users) in a room or other area, and presenting received contact card information in a user interface according to the determined positions or locations.

Innovative aspects of the subject matter described in this specification can be embodied in methods that include actions of: receiving a request to communicate a digital contact card of a first user to at least one second user; determining at least one style characteristic for the digital contact card, the at least one style characteristic associated with a group of users that includes the first user; generating the digital contact card according to the at least one style characteristic, the digital contact card including contact information for the first user; and communicating the digital contact card to at least one network address associated with a computing device of the at least one second user.

Innovative aspects of the subject matter described in this specification can be embodied in methods that include actions of: receiving a first input provided by a first user through a user interface (UI), the first input identifying at least one second user to receive a digital contact card of the first user; and communicating a card distribution request to cause a remote service to generate the digital contact card of the first user and send the digital contact card to the at least one second user, wherein the digital contact card includes contact information for the first user and is generated according to at least one style characteristic associated with a group of users that includes the first user.

Innovative aspects of the subject matter described in this specification can be embodied in methods that include actions of: receiving signal information describing a plurality of signals received by at least one receiver, each of the plurality of signals emitted from one of a plurality of portable computing devices; analyzing the signal information to determine location information that indicates a location of each of the plurality of portable computing devices relative to a reference object; and communicating the location information for presentation through a user interface (UI) on a computing device of a first user, wherein the location information is presented with a digital contact card for at least one second user associated with at least one of the plurality of portable computing devices.

Implementations can optionally include one or more of the following features: the actions further include in response to receiving at least one updated style characteristic associated with the group of users, generating an updated digital contact card according to the at least one updated style characteristic, the updated digital contact card including the contact information; the actions further include communicating the updated digital contact card to the at least one network address associated with the computing device of the at least one second user; the at least one style characteristic includes one or more of a font, a logo, a layout, a color scheme, or an organization name; the contact information includes one or more of a name, a title, a mailing address, a telephone number, an email address, a social network address, or a signature of the first user; the request indicates a selection of the digital contact card from a plurality of digital contact cards associated with the first user; each of the plurality of digital contact cards is associated with a respective set of style characteristics; and/or each of the plurality of digital contact cards is associated with a respective group that includes the first user and that is associated with the respective set of style characteristics.

Implementations can optionally include one or more of the following features: the at least one style characteristic includes one or more of a font, a logo, a layout, a color scheme, or an organization name; the contact information includes one or more of a name, a title, a mailing address, a telephone number, an email address, a social network address, or a signature of the first user; the actions further include receiving a second input provided by the first user through the UI, the second input selecting the digital contact card from a plurality of digital contact cards associated with the first user; each of the plurality of digital contact cards is associated with a respective set of style characteristics; each of the plurality of digital contact cards is further associated with a respective group that includes the first user and that is associated with the respective set of style characteristics; the actions further include presenting location information through the UI, the location information indicating a respective location of each of a plurality of available recipients; the first input indicates a selection of the at least one second user from the plurality of available recipients; the location information indicates the respective location of each of the plurality of available recipients relative to a reference object in a room with the first user; and/or presenting the location information includes filtering the location information to present the respective location of the plurality of available recipients who are within a threshold distance of the first user.

Implementations can optionally include one or more of the following features: the location information further indicates the location of each of the plurality of portable computing devices relative to the computing device of the first user; the plurality of portable computing devices are associated with a plurality of second users who are available as recipients of a digital contact card of the first user; the actions further include receiving a request that indicates a selection by the first user of at least one of the plurality of second users to receive the digital contact card and, in response to the request, generating the digital contact card and communicating the digital contact card to the at least one of the plurality of second users; the signal information describes, for a respective signal of the plurality of signals, a plurality of signal strengths for the respective signal detected by a plurality of receivers; the location of the portable computing device that emitted the respective signal is determined based on the plurality of signal strengths and locations of the plurality of receivers; the plurality of signals are radio frequency signals; the plurality of signals are BlueTooth Low Energy (BTLE) signals; and/or the location of each of the plurality of portable computing devices is further based, at least in part, on a visual indication emitted from each of the plurality of portable computing devices.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or technical improvements over previously available systems. By dynamically generating digital contact cards based on current style information for an organization, implementations ensure that the generated digital contact cards are up-to-date and consistent across an organization. Traditional systems for distributing electronic contact information may provide style updates in an ad hoc and inconsistent manner, leading to the distribution of inconsistent and even erroneous contact information for individuals across an organization. Accordingly, traditional systems may expend processing time, network bandwidth, storage space, memory, and/or other computing resources to correct errors and inconsistencies in contact information distribution. Implementations described herein avoid such wasteful expenditure of computing resources by providing a platform for updating style information and/or contact information for digital contact cards and dynamically generating digital contact cards based on the updated style information and/or contact information.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
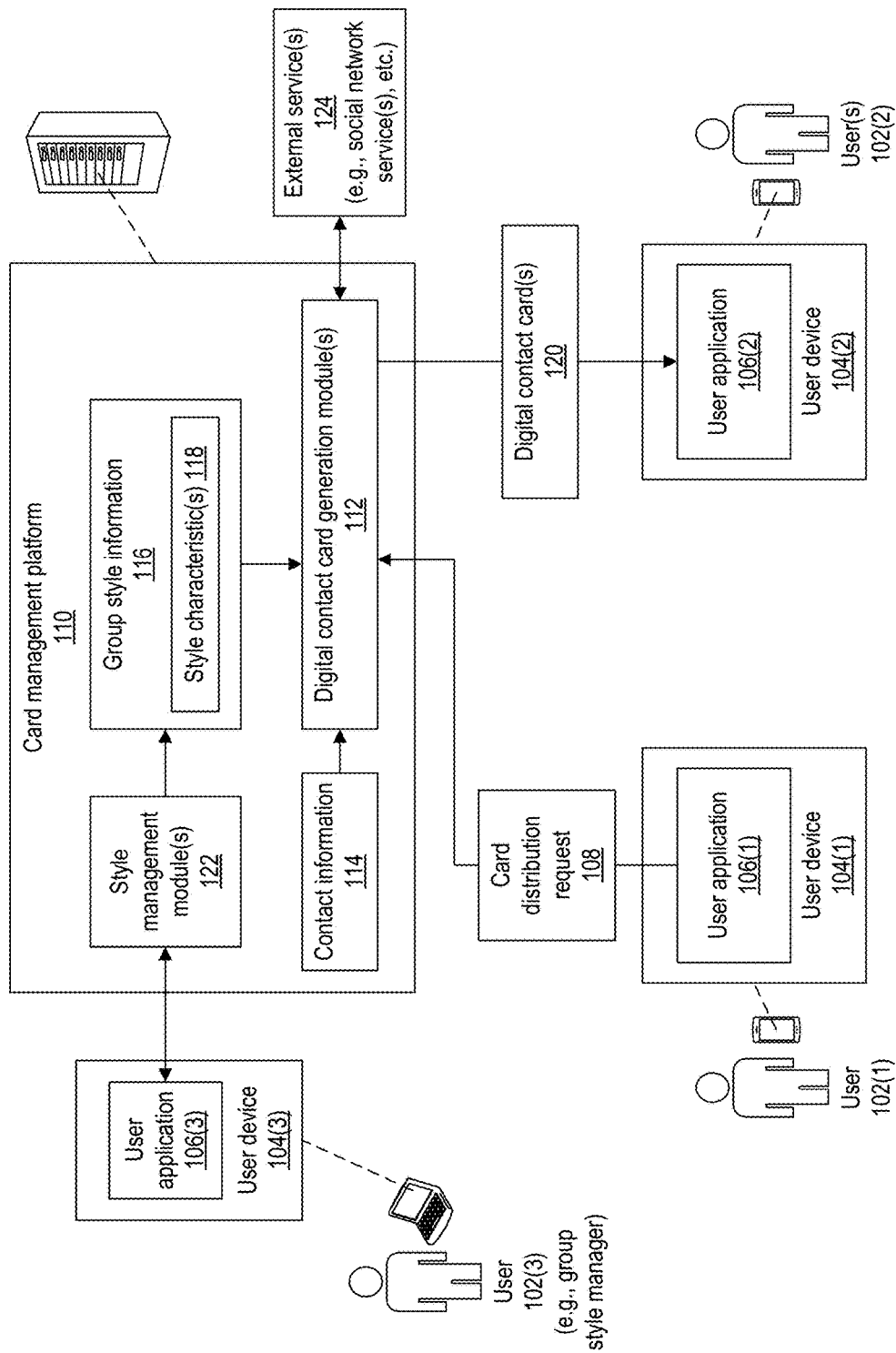
FIG. 1 depicts an example system for digital card management, according to implementations of the present disclosure.

Implementations of the present disclosure are directed to systems, devices, methods, and computer-readable media for managing the generation, style, and distribution of digital contact cards. An organization, such as a business, may access a card management platform and upload style information for digital contact card(s). Such style information may include an arrangement and/or layout of the card(s), an organization name and/or logo to be included on the card(s), the font, color, size, or other characteristics of the text on the card(s), and so forth. A user, such as a member of the organization, may access the platform to request the distribution of a digital contact card to one or more recipients. In response to the request, the platform may generate a digital contact card for the user based on the previously specified style information. The digital contact card may then be distributed to the one or more recipients identified by the user.

Traditionally, an individual may collect and hand out physical contact cards (e.g., paper cards) at meetings or conferences, and return home with a large number of cards. In some instances, the individual, an assistant, or a marketing professional may scan and create digital images of the cards, which may be archived for later use. Marketing departments may design the cards (e.g., with email and/or social media signatures) to provide a unified corporate image, logo, and/or marketing presence. Because an organization (e.g., a business) may periodically change its name, logo, address, or other information, different individuals within the organization may, at any given time, be handing out cards with different styles, looks, logos, and so forth depending on when their cards were printed. Accordingly, organizations may face a challenge in providing a consistent and up-to-date version of their contact cards. Moreover, an individual may also change roles within the organization, leading to a change of title, address, and/or other contact information. Accordingly, organizations also face a challenge in providing an up-to-date version of contact cards for individuals whose status has changed within the organization. Both challenges may lead to the expenditure of time, money, and/or resources within an organization to ensure that contact cards are up-to-date for all individuals within the organization, and to ensure that all of the individuals are handing out cards with a uniform style or design.

Implementations address these challenges by providing a digital card management platform (e.g., the platform) for generating and distributing digital contact cards for the individuals within an organization. An organization (e.g., a business) may register for a card management service (e.g., the service) provided by the platform. An individual affiliated with the organization, such as a marketing professional, may upload style information to the platform. The style information may indicate style characteristics for the digital contact cards to be generated and distributed on behalf of individuals (e.g., employees) within the organization. The individuals may access the service to provide their contact information (e.g., name, address, email address, title, telephone number, etc.) and request digital contact card(s) to be distributed to recipient(s). The digital contact card(s) for an individual may be generated to include the individual's contact information presented according to the current style characteristic(s) associated with the organization. On receiving updated style information for an organization, the platform may dynamically apply style changes to the generated digital contact cards, thus ensuring that the distributed cards have a uniform design, appearance, and style across the individuals in the organization.

FIG. 1 depicts an example system for digital card management, according to implementations of the present disclosure. As shown in the example of FIG. 1, the system may include a first user device 104(1) operated by a first user 102(1), and a second user device 104(2) operated by a second user 102(2). The user devices 104 may include any suitable type of computing device. In some examples, one or both of the user devices 104 is a portable computing device such as a smartphone, tablet computer, wearable computer, and so forth. The user device 104(1) may execute a user application 106(1). In some instances, the user device 104(2) may execute a user application 106(2) (e.g., another instance of the user application 106(1) or a different application). In some examples, user application 106(1), 106(2), and/or 106(3) is a web application in which web content is rendered on the user device(s) 104 in a web browser and/or other web content container (e.g., UIWebView object, WebView object, etc.) that executes on the user device(s) 104. In some examples, user application 106(1), 106(2), and/or 106(3) is a native application configured to run on the hardware and/or software environment of the user device(s) 104.

The user 102(1) may employ the user application 106(1) to generate a card distribution request 108, requesting that one or more digital contact cards 120 be distributed to one or more recipient user(s) 102(2). In some implementations, the card distribution request 108 includes an identifier for each of one or more recipient users 102(2). Such an identifier may include a name, email address, telephone number, and/or other information that uniquely identifies the recipient(s) from among a population of possible recipients. In some implementations, the card distribution request 108 may identify a particular type of digital contact card 120 to be distributed for the user 102(1). For example, the user 102(1) may be associated with different groups within an organization, or may be associated with different organizations (e.g., a business and a non-profit charitable organization). As another example, the user 102(1) may be associated with a business and may also run their own business as a side venture. In such instances, the user 102(1) may choose the particular card to be generated and distributed to recipient(s) (e.g., the card for the selected organization and/or group among multiple organizations and/or groups that the user 102(1) is affiliated with).

In some implementations, the service may support multiple types of cards for a particular user 102(1), such as a standard business card, a social network card (e.g., indicating a social network presence of the user), and/or a personal card (e.g., including personal contact information for the user). In such instances, the user 102(1) may select a particular card to be generated from among a plurality of possible cards for the user 102(1). Determining digital contact card(s) and/or recipient user(s) 102(2) is described further with reference to FIGS. 3, 4A, and 4B.

The card distribution request 108 may be communicated, over one or more networks, to one or more digital contact card generation modules 112 executing on a card management platform 110. The card management platform 110 may include any suitable number and type of computing device(s), such as server computers, distributed computing (e.g., cloud computing) systems, and so forth. In response to receiving the card distribution request 108, the digital contact card generation module(s) 112 may dynamically generate a digital contact card 120 for the user 102(1). In some examples, the user 102(1) may have previously employed the user application 106(1) to specify contact information 114 for the user 102(1). In such instances, the digital contact card 120 may be generated to include the contact information 114 previously provided. In some instances, the card distribution request 108 may include the contact information 114 to be included in the digital contact card 120. In some examples, the contact information 114 for a user 102(1) may be provided to the service by an individual other than the user 102(1) (e.g., such as a human resources and/or marketing professional associated with the organization).

The contact information 114 for the user 102(1) may include but is not limited to one or more of the following: a name (e.g., first name, last name, middle name, middle initial, prefix, and/or suffix), a title (e.g., Director of Marketing, Vice President of Operations, Development Team Lead, Senior Analyst, etc.), a street address, an email address, a telephone number, a Uniform Resource Identifier (URI) such as a Uniform Resource Locator (URL) or Uniform Resource Name (URN) of a web page for the user, and so forth. In some examples, the contact information 114 may include media content, such as an audio file, video file, graphics file, image(s), and so forth. For example, the contact information 114 may include an image of the user's face. As another example, the contact information 114 may include an audio and/or video clip of the user 102(1) introducing themselves, presenting at a conference, or other content.

The digital contact card 120 for a user 102(1) may be generated to include the user's contact information 114 according to one or more style characteristics 118 specified in group style information 116. The group style information 116 may be associated with a group to which the user 102(1) belongs. For example, user 102(1) may be an employee, contractor, officer, board member, or other individual associated with an organization (e.g., company, business, non-profit organization, etc.), and the group style information 116 may be for the organization as a whole. As another example, the user 102(1) may be an employee within a particular division, group, team, or other sub-organization within a broader organization (e.g., a company), and the group style information 116 may be for that particular sub-organization.

The style characteristic(s) 118 may include but are not limited to one or more of the following: a layout for the card, including a location, dimensions, and/or orientation of elements to be displayed on the card; characteristic(s) of text to be displayed on the card, including a font, size, color, style (e.g., bold, italic, underscore, caps, etc.), or other aspects of one or more text elements; a logo to be presented on the card, such as a logo of the organization; background colors, patterns, and/or other design aspects of the card. The style characteristic(s) 118 may also include the organization name and/or the manner in which the organization name is to be displayed. For example, the style characteristic(s) 118 may indicate whether an organization name is displayed as "ABC Widgets," "ABC Widgets, Ltd.," or "ABC." In some examples, the style characteristic(s) 118 may indicate which portions of the contact information 114 are to be presented on the generated card. For example, the style characteristic(s) 118 may indicate that the user's phone number is to be presented as well as (or without) organization's fax number. As another example, the style characteristic(s) 118 may indicate whether the card is to be generated to include or omit a link (e.g., URL) to the user's biographical page on an organization's web site.

In response to the card distribution request 108, a digital contact card 120 may be dynamically generated for the user 102(1) and sent to one or more recipient users 102(2) identified in the card distribution request 108. The digital contact card 120 may be generated based on the current contact information 114 and style characteristic(s) 118 for the user 102(1). In some examples, the particular set of style characteristic(s) 118 used may be those that are in the group style information 116 associated with the particular type of card that the user 102(1) selected to be generated. For example, if a user 102(1) is affiliated with both an organization A (e.g., a business) and an organization B (e.g., a charitable organization), the user 102(1) may select to have a card generated that indicates the user's affiliation with organization B. The card distribution request 108 may indicate this selection, and the digital contact card 120 may be generated according to the group style information 116 for organization B.

The digital contact card 120 for the user 102(1) may be communicated, over one or more networks, for presentation in a user application 106(2) that executes on the user device(s) 104(2) of the recipient user(s) 102(2). In some examples, the user application 106(2) may be a general purpose communications client, such as an email client, short message service (SMS) client, multimedia messaging service (MMS) client, and so forth. In such examples, the digital contact card 120 may be sent using the corresponding communication protocol such as an email protocol (e.g., SMTP, IMAP, etc.), SMS, MMS, and so forth. In some examples, the user application 106(2) may be an instance of the user application 106(1) used to generate the card distribution request 108. For example, the service may provide a user application 106 that enables a user 102 to share digital contact card(s) 120 with others as well as view the digital contact card(s) 120 that the user 102 has received from others.

In some implementations, the digital contact card generation module(s) 112 may communicate with one or more external services 124 to retrieve information to be included on the digital contact card(s) 120. For example, the digital contact card generation module(s) 112 may communicate with one or more social network services to retrieve social network information for the user 102(1), such as a link to the user's social network page. Such information may then be included in the digital contact card(s) 120 (e.g., according to the applicable style characteristic(s) 118).

In some implementations, the card management platform 110 may execute one or more style management modules 122 that are useable to specify the group style information 116 including style characteristic(s) 118. A user 102(3) may employ a user application 106(3) executing on a user device 104(3) to interface with the style management module(s) 122 and add, remove, and/or update the style characteristic(s) 118. The user 102(3) may be a style manager for a particular group or organization, such as a marketing professional responsible for managing the marketing presence of a business or other organization. In some examples, the user application 106(3) may be the same user application 106(1), and the user 102(3) may be authorized to access a particular section of the user application 106(1) to manage the group style information 116. In some examples, the user application 106(3) may be a different application from the user application 106(1).

In some implementations, the digital contact card(s) 120 for a user 102(1) may be generated and/or sent dynamically in response to the receipt of the card distribution request 108 at the card management platform 110. As used herein, a dynamic action may describe an action that is performed based on another event and without any intentional delay between the action and the event, taking into account the processing and/or communication limitations of the computing system(s) performing the action and the time needed to initiate and/or perform the action. The triggering event may be a received communication, a detection of a particular application state, and so forth. A dynamic action may also be described as an action performed in real time. Dynamic actions may include actions that can be automatically executed in response to the event without requiring human input. In some examples, a dynamic action may be performed within a same execution path as a process that detects and/or handles the triggering event. For example, the dynamic action may be performed or initiated by code that executes as part of the handling of the event and/or in response to a message that is sent as part of the handling of the event. A dynamic action may therefore be described as being performed synchronously with respect to the triggering event.

In some examples, a dynamically generated digital contact card 120 may be stored in memory on the card management platform 110 or elsewhere. In response to a subsequent card distribution request 108 for the same type of card from the same user 102(1), the digital contact card generation module(s) 112 may retrieve the stored card from storage and send the card to the recipient user(s) 102(2) instead of generating a new digital contact card 120. In some instances, the stored digital contact card 120 may be retrieved and sent if the underlying group style information 116 and/or contact information 114 for the user 102(1) has not changed since the card was initially generated and stored.

Although the example of FIG. 1 shows particular users 102 using particular types of user devices 104 (e.g., smartphones for users 102(1) and 102(2) and a laptop computer for user 102(3)), these examples are not limiting. The user devices 104 may include any suitable type of computing device, including portable and non-portable (e.g., less readily portable) computing devices.

Implementations support various formats for the digital contact cards 120. In some implementations, the digital contact cards 120 may be arranged according to a version of the vCard format standard for digital business cards. In some implementations, the digital contact cards 120 may be generated as image files that are formatted according to any suitable image file format, such as a version of the Joint Photographic Experts Group (JPEG) standard, the Graphics Interchange Format (GIF), the Portable Document Format (PDF) developed by Adobe Systems™, and so forth. In some implementations, the generated and distributed digital contact cards 120 may include signatures for email, social media messages, and/or other types of communications.

Figure 2:
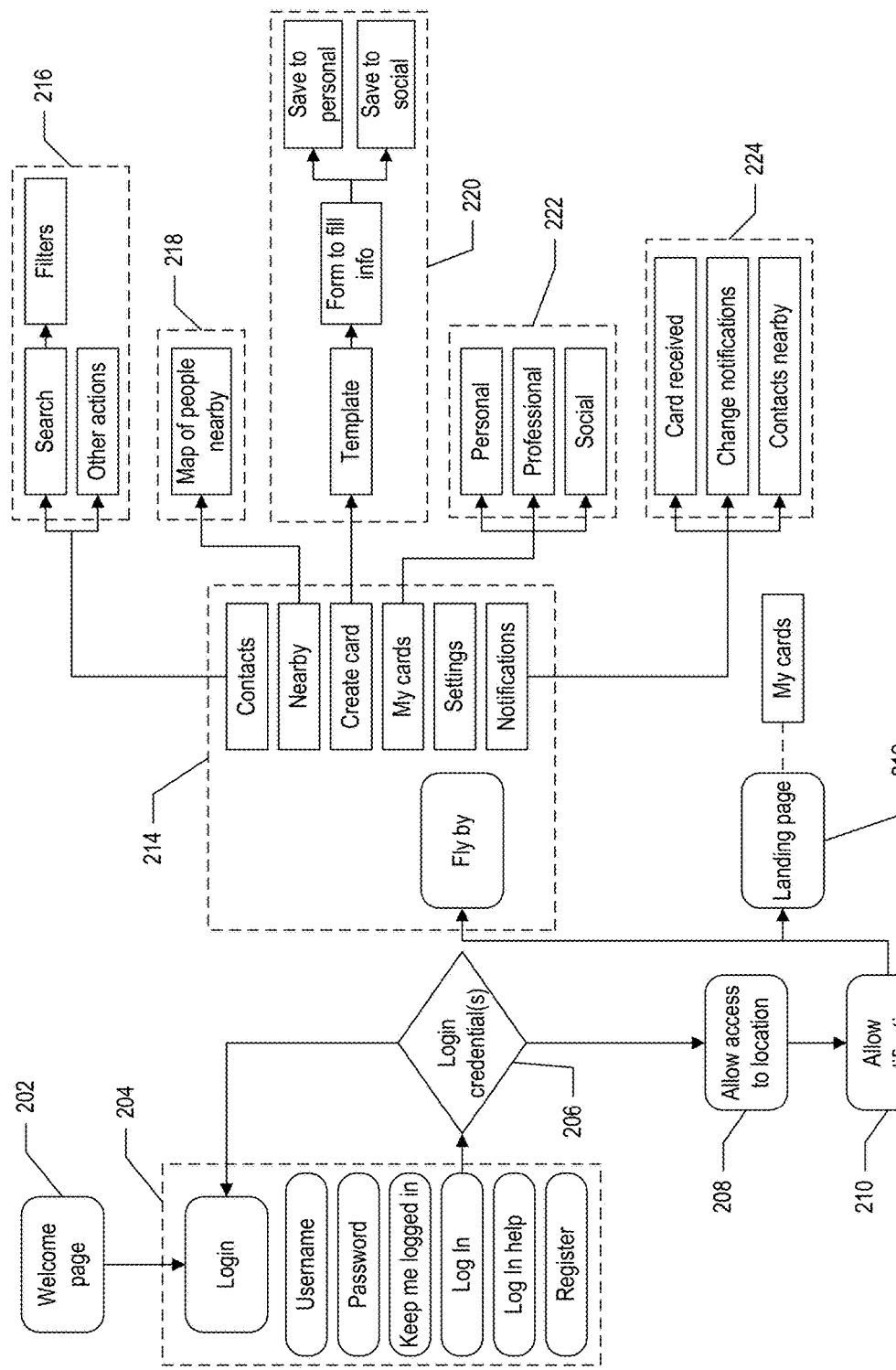
FIG. 2 depicts an example flow map for an application used for digital card management, according to implementations of the present disclosure.

FIG. 2 depicts an example flow map for a user application 106 that may be accessed by a user 102 for digital card management, according to implementations of the present disclosure. On launching, the user application 106 may present a welcome page 202 describing the service. From there, the user application 106 may enable a user 102 to navigate to a login page 204. The login page 204 may enable the user 102 to enter credentials such as a username, password, personal identification number (PIN), and so forth. The login page 204 may also include other features for a user 102 to request log in help or indicate that the user application 106 should keep the user 102 logged in (e.g., such that credentials are not needed for a subsequent access within a period of time). The login page 204 may also enable a new user 102 to register for the card management service.

After entering credential(s) the user 102 may select a log in option to cause the credential(s) to be communicated to and verified (206) by the card management platform 110. If the credential(s) are invalid, the login page 204 may be shown again. If the credential(s) are valid, the user 102 may be given further access to the user application 106. The user 102 may be prompted to indicate whether the user application 106 is to be allowed access to location information (208) for the user device 104 and/or whether notification(s) are to be allowed (210).

The user application 106 may then present a landing page 212 and various fly by options 214. The fly by options 214 may enable the user 102 to navigate among the various sections of the user application 106. In some implementations, the fly by options 214 may include sections for contacts, nearby, create card, my cards, settings, and/or notifications. In some implementations, the landing page 212 may present a default section of the user application 106 (e.g., the "my cards" section).

The contacts section 216 of the user application 106 may include one or more features to enable the user 102 to search for current and/or potential contacts based on identifying information (e.g., name, email address, etc.), location, and/or other criteria. The contacts section 216 may include features to enable filtering of contacts based on various criteria, such as location, organization, title, and so forth. The contacts section 216 may also include features for other actions.

The nearby section 218 of the user application 106 may include feature(s) to enable a user 102 to view a set of individuals who are nearby, such as potential contacts and possible recipients of the user's digital contact card 120. In some implementations, the nearby section 218 may present a map or other schematic of nearby individuals, such as individuals within a particular threshold distance and/or in the same room as the user 102.

The create card section 220 of the user application 106 may include feature(s) to enable a user 102 to specify contact information 114 and/or style information 116 for one or more digital contact cards 120. In some implementations, the create card section 220 may provide a template with one or more forms into which the user 102 may add their contact information 114. The create card section 220 may also include features to enable the user 102 to save the information for a particular card, such as the user's professional (e.g., business) card, personal card, social card, and so forth.

The my cards section 222 of the user application 106 may enable the user 102 to view the various types of cards currently available to be sent on behalf of the user 102, such as a professional card, a social card, and a personal card. The user 102 may also select a card to edit the contact information 114 and/or style information 116 for that card.

The notifications section 224 of the user application 106 may allow the user 102 to view notifications that have been received regarding card(s) that have been sent to the user 102, current and/or potential contacts who are nearby, and/or notifications regarding changes to the group style information 116 or other changes that may trigger the regeneration and resending of digital contact card(s) 120 for the user 102.

The settings section of the user application 106 may enable the user 102 may modify particular settings for the user application 106. Such settings may include, but are not limited to: enabling or disabling the application's access to location information; enabling or disabling notifications such as those presented in the notifications section 224; selecting language preferences; viewing and/or changing account information; viewing and/or changing social network information, such as the user's social network name and/or link for one or more social network services; and/or setting a radius to be used as a distance threshold for nearby notifications.

Figure 3:
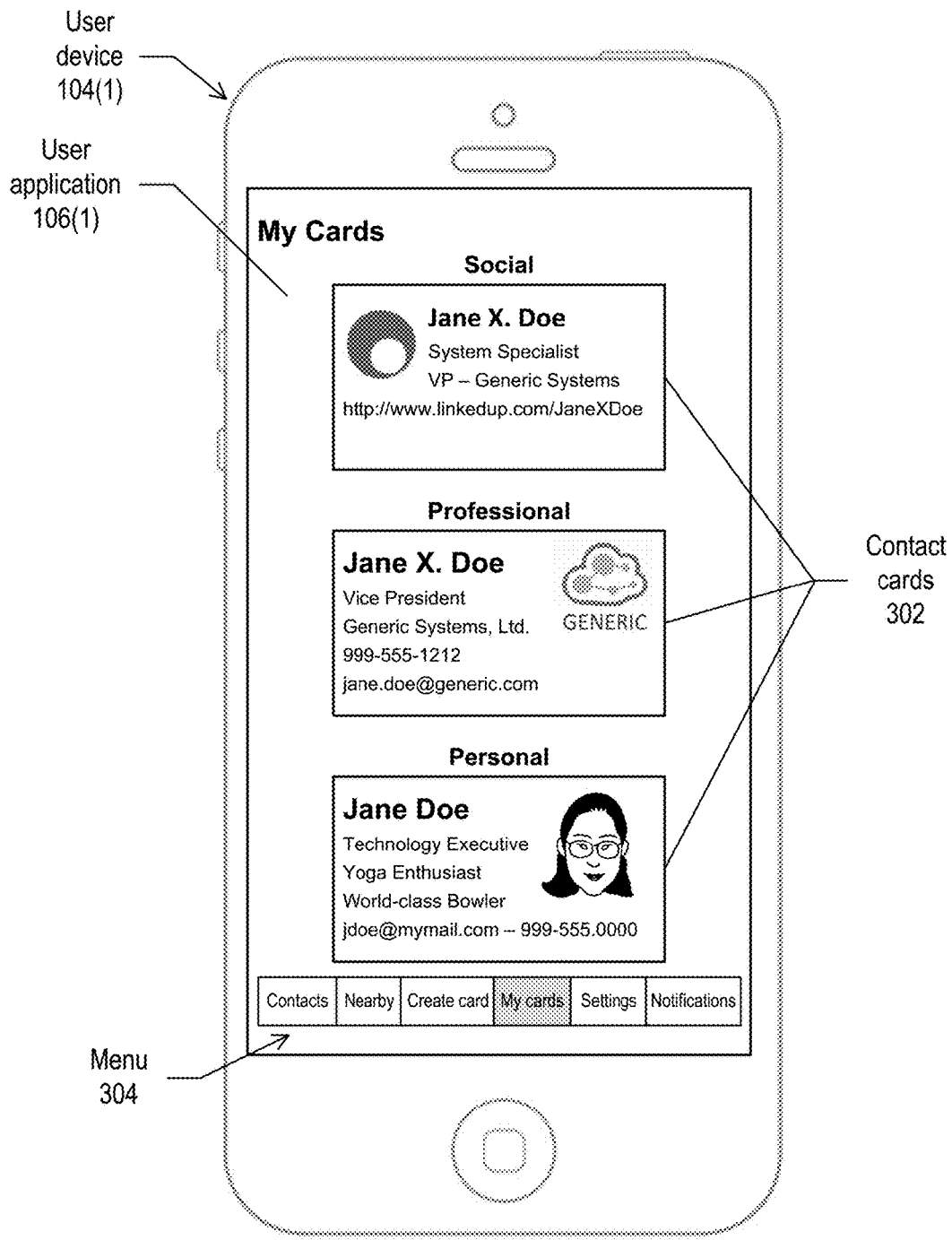
FIG. 3 depicts an example user interface for an application used for digital card management, according to implementations of the present disclosure.

FIG. 3 depicts an example user interface (UI) for a user application 106 used for digital card management, according to implementations of the present disclosure. In the example of FIG. 3, the user application 106 is presenting the My Cards page or section of the application to enable a user 102 to view their currently digital contact cards 120 that are currently available for distribution. In this example, the user 102 (e.g., "Jane X. Doe") has three contact cards 302 for various situations, including professional situations, social situations, and personal situations. For example, the user 102 may choose to have her professional contact card 302 distributed to business colleagues, peers in her field, potential clients and/or customers, potential employers, potential employees, and so forth. The user 102 may choose to have her social contact card 302 distributed to advertise her presence on a social network (e.g., "linkedup.com" in the example shown). The user 102 may choose to have her personal contact card 302 distributed to individuals with whom she may interact in a personal or casual (e.g., non-professional) setting, such as friends, family, neighbors, fellow club members, amateur sports teammates, and so forth. The UI may also present a menu 304 to enable the user 102 to navigate among the various sections of the user application 106, as described with reference to FIG. 2.

Figure 4:
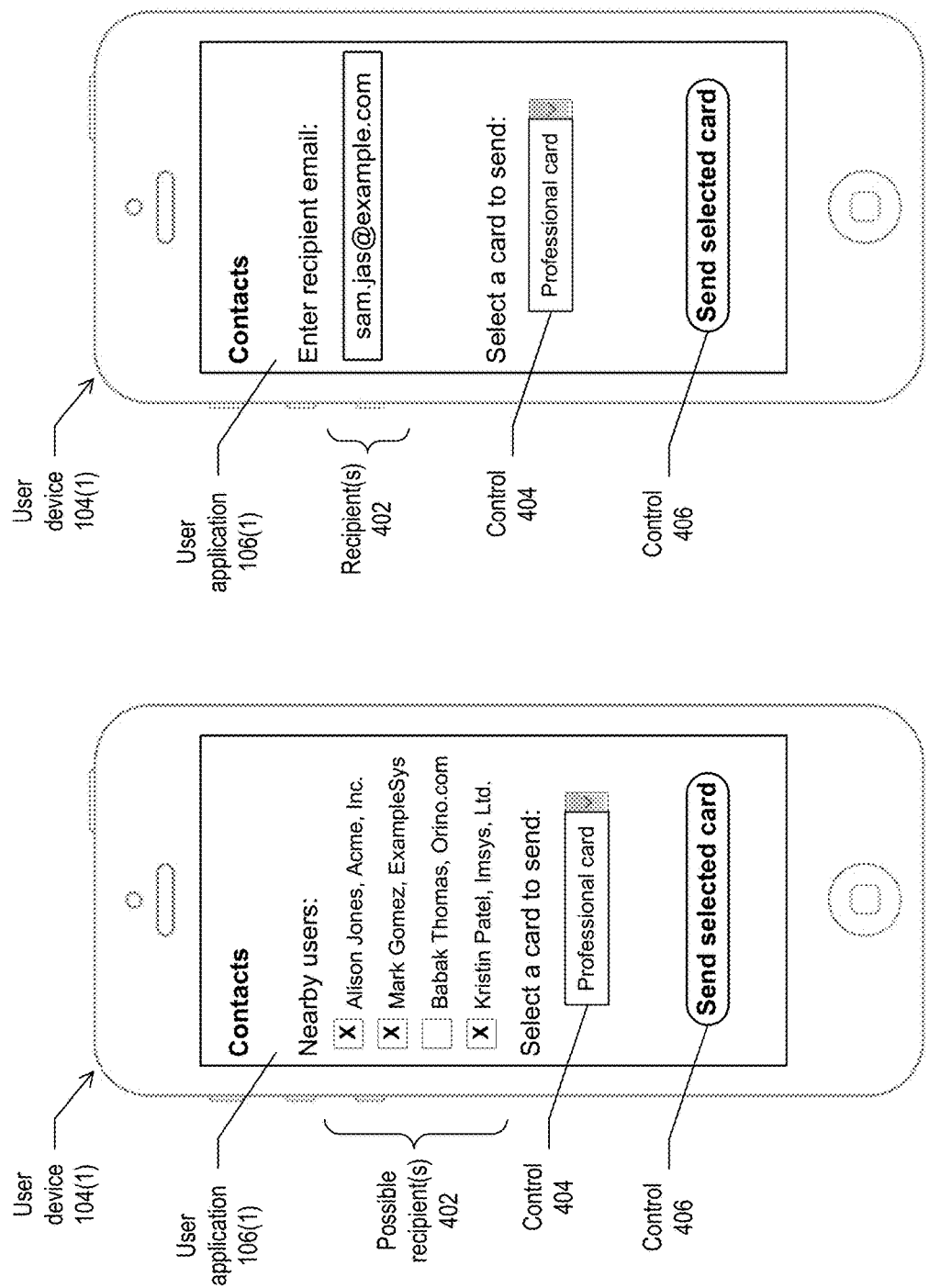
FIGS. 4A and 4B depict an example user interface for an application used for digital card management, according to implementations of the present disclosure.

FIGS. 4A and 4B depict an example UI for a user application 106 used for digital card management, according to implementations of the present disclosure. In the example of FIGS. 4A and 4B, the user application 106 is presenting the Contact page or section of the application to enable a user 102(1) to generate a card distribution request 108. In FIG. 4A, the Contacts section is presenting a list of possible recipient user(s) 102(2) that is determined based on a proximity of the user(s) 102(2) to the logged in user 102(1). For example, the service may identify other registered users of the service who are within a predetermined threshold distance (e.g., 100 meters) of the currently logged in user 102(1). The user 102(1) may select among the possible recipient(s) 402 to indicate which user(s) 102(2) are to receive a digital contact card 120.

The UI may also present a control 404 to enable the user 102(1) to select the particular card to be generated (or retrieved from storage) and sent, such as the user's professional card, personal card, social card, and so forth. The UI may present a control 406 which the user 102(1) may click or otherwise manipulate to cause a card distribution request 108 to be generated and sent according to the selections made for possible recipient(s) 402 and card type.

In the example of FIG. 4B, the UI presents a dialog to enable the user 102(1) to enter identification information for one or more recipients 402, such as the recipients' names, email addresses, telephone numbers, and so forth. The user 102(1) may then use the controls 404 and 406 to select a particular card type to be sent and trigger the card distribution request 108 according to the selections made for possible recipient(s) 402 and card type.

Implementations may also provide other techniques to enable the user 102(1) to identify recipient user(s) 102(2). For example, the service may retrieve social network contact information for the user 102(1) from the external service(s) 124. The contact information may be communicated to the user application 106 which may present a list of social network contacts of the user 102(1). The user 102(1) may then choose recipient user(s) 102(2) from among their social network contacts. In some implementations, the UI of the user application 106 may present a map showing nearby users (e.g., possible recipients) with respect to geographic features, and the user 102(1) may select recipient(s) from among the nearby users. In some implementations, the UI may present a schematic showing the locations of nearby users with respect to features in a room or other indoor space where the user 102(1) is currently located, or an outdoor space. The user 102(1) may select recipient(s) from among the nearby users. This example is described further with reference to FIGS. 8-10. Although examples herein may describe a particular user 102(1) as a sender of a card and a particular user 102(2) as a recipient of a card, any user 102 may at various times be sender and/or a recipient of a card.

Figure 5:
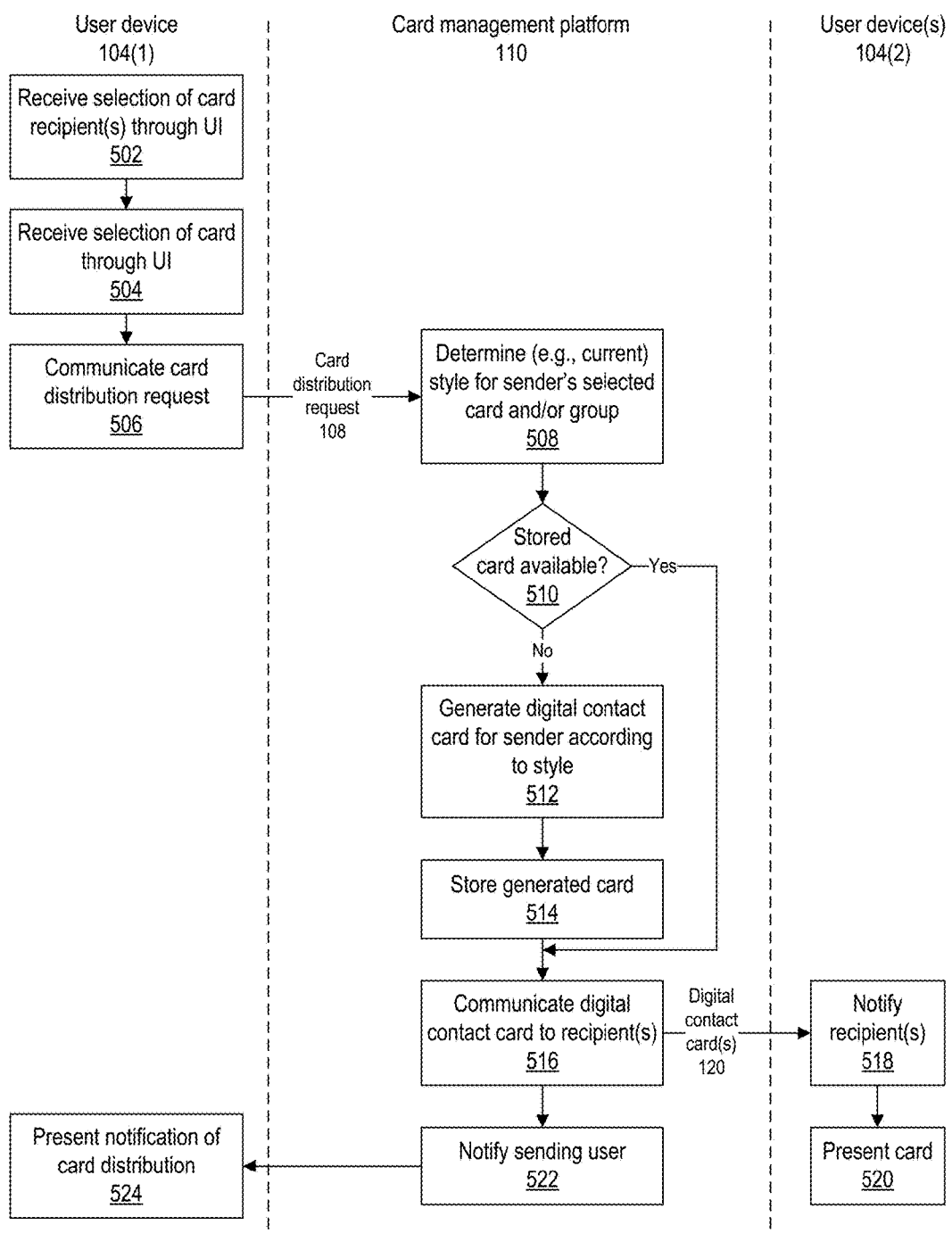
FIG. 5 depicts a flow diagram of an example process for digital card generation and distribution, according to implementations of the present disclosure.

FIG. 5 depicts a flow diagram of an example process for digital card generation and distribution, according to implementations of the present disclosure. Operations of the process may be performed by one or more of the user application 106, the digital contact card generation module(s) 112, the style management module(s) 122, and/or other software module(s) executing on the user device(s) 104, the card management platform 110, or elsewhere.

A selection of recipient user(s) 102(2) may be received (502). As described above, the selection of recipient(s) may be made by the sending user 102(1) through the UI of the user application 106(1) executing on the user device 104(1). A selection of the particular card, or type of card, may also be received (504) through the UI. As described above, the user 102(1) may select from among multiple cards that are available to the user 102(1), such as the user's professional, social, and personal cards. In instances where the user 102(1) is affiliated with multiple companies and/or other organizations, the UI may enable the user 102(1) to select a card that describes the user's affiliation with a particular one of their organizations.

A card distribution request 108 may be generated by the user application 106(1) based on the user's selection of recipient(s) and/or card type, and the card distribution request 108 may be communicated (506) to the card management platform 110 over one or more networks.

On receiving the card distribution request 108, the digital contact card generation module(s) 112 may access the group style information 116 and determine (508) the particular set of style characteristic(s) 118 that are currently associated with the organization, group, and/or particular card that the user 102(1) has requested for distribution. For example, if the card distribution request 108 indicates that the card is for the user's association with Organization A, the current set of style characteristic(s) 118 for Organization A may be retrieved and used to generate the digital contact card 120. If the card distribution request 108 indicates that the card is the user's personal card, the current set of style characteristic(s) 118 for the user's personal card may be retrieved and used.

In some implementations, a determination may be made (510) whether a digital contact card 120 of the same type and for the same user 102(1) is available. In some instances, a digital contact card 120 may have been previously generated and stored in persistent memory (e.g., cached) to be available for subsequently requested distributions. If the previously generated card corresponds to the same type of card and the same user 102(1) as indicated in the card distribution request 108, and if the contact information 114 and relevant style characteristic(s) 118 have not changed since the card was generated and stored, the previously generated digital contact card 120 may be retrieved from storage and communicated (516) to the recipient(s) identified in the card distribution request 108.

If a stored card is not available, or if the stored card is out-of-date with respect to contact information 114 and/or style characteristic(s) 118, a new digital contact card 120 may be generated (512) for the sending user 102(1). The digital contact card 120 may be generated to include the user's current contact information 114, and may be generated according to the currently stored set of style characteristic(s) 118 corresponding to the group, organization, and/or type of card to be distributed. In some implementations, the generated card may be stored (514) in persistent memory to be used for subsequently requested distributions of the same type of card for the same user.

The digital contact card 120 (e.g., newly generated or retrieved from storage) may be communicated (516) over one or more networks to the one or more recipient user(s) 102(2) identified in the card distribution request 108. In some implementations, the recipient user(s) 102(2) may be notified (518) that they have received a card from the sending user 102(1). The card may be made available for presentation (520) on the user device 104(2) of the recipient user(s) 102(2). In some implementations, the recipient user 102(2) may employ the user application 106(2) to indicate whether to keep or discard the received digital contact card 120. Kept cards may be stored in persistent storage for later access by the user 102(2). On receiving a card, user application 106(2) may present the recipient user 102(2) with an option to send their own digital contact card 120 back to the sending user 102(1).

In some implementations, the service may notify (522) the sending user 102(1) that the requested card distribution has been performed. A notification may be communicated to the user device 104(1) and presented (524) in the user application 106(1).

In some implementations, the card management platform 110 may include functionality to store the digital contact cards 120 received by users 102. A user 102 may log into the service and view their previously received cards. The service may also allow a user 102 to view a history of card distributions, including the date and/or time, recipient(s), and/or card types requested in previous card distribution requests 108. The service may enable a user 102 may manage their contacts by viewing potential contacts (e.g., who may be sent cards for the user), current contacts (e.g., who have received cards for the user), adding or removing contacts, editing contacts (e.g., adding notes), and so forth.

In some implementations, the card distribution request 108 may indicate a natural language to be employed in generating the digital contact cards 120. For example, the user 102(1) may indicate through the UI that the cards are to be generated in Japanese, English, Spanish, Russian, or some other language. In some implementations, the card management platform 110 may automatically determine a natural language to use based on a location and/or characteristics of the recipient user(s) 102(2). For example, a registered user 102(2) of the service may indicate a language preference of Japanese, and cards that are sent to that user 102(2) may present text in Japanese.

Figure 6:
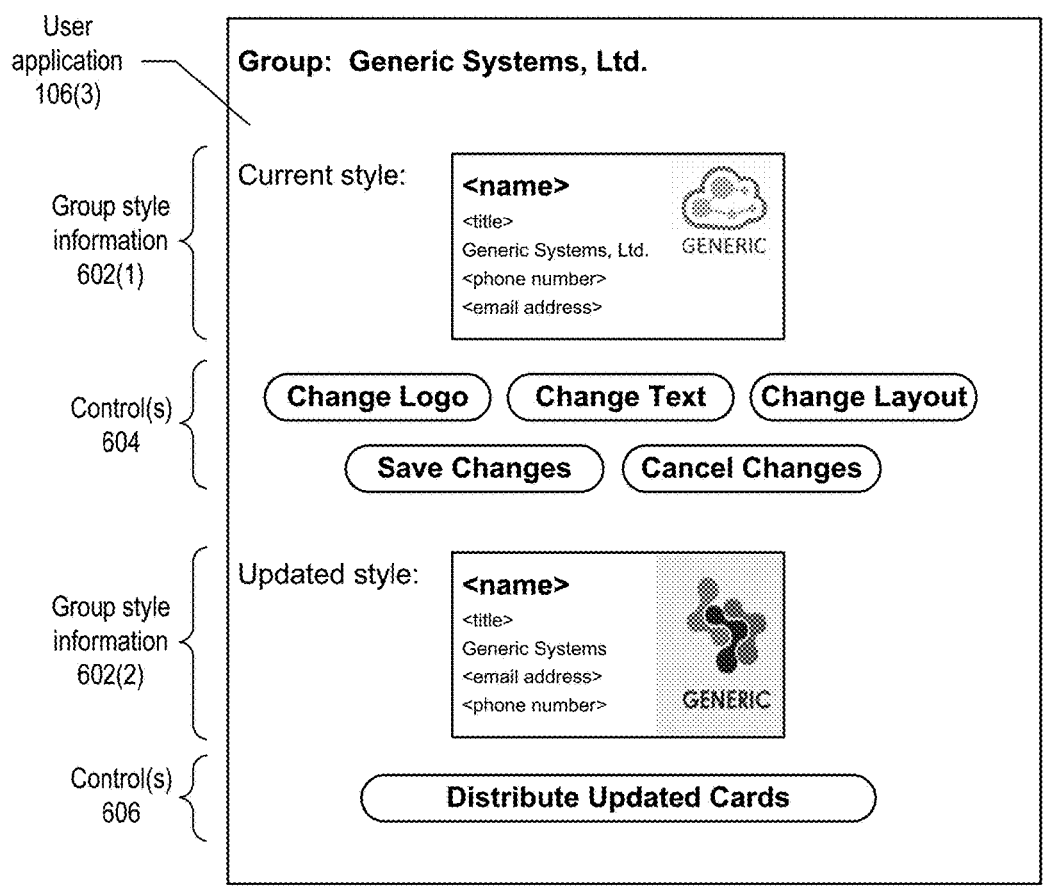
FIG. 6 depicts an example user interface for an application used for digital card management, according to implementations of the present disclosure.

FIG. 6 depicts an example UI for a user application 106 used for digital card management, according to implementations of the present disclosure. In particular, FIG. 6 provides an example UI for a user application 106(3) that a user 102(3) may employ to manage group style information 116 for an organization, sub-division of an organization, or other group.

In some implementations, the UI may present an example (e.g., template) card arranged according to the currently stored group style information 602(1). The UI may provide various control(s) 604 to enable a user 102(3) to alter the current style, such as change the logo, change the text, and/or change the layout of elements on the card. A change of logo may include uploading a new image file to be used as a new logo on the cards. Text changes may include changes to the content of text elements as well as changes to the font, color, size, dimensions, effects (e.g., italics, bold, etc.), and/or other characteristics of the text presented on the cards. Layout changes may include altering the position, orientation, and/or size of the various elements (e.g., text, logo, etc.) included on the cards. The control(s) 604 may also allow the user 102(3) to save or cancel the changes they have made.

In the example of FIG. 6, the user 102(3) has made various style changes which are presented as group style information 602(2). For example, the user 102(3) has uploaded a new logo, changed the text for the company name (e.g., "Generic Systems" instead of "Generic Systems, Ltd."), and changed the arrangement of the individual's email address and phone number on the cards.

In some implementations, the UI may include control(s) 606 that enable the user 102(3) to request a distribution of updated cards. For example, the service may store a history of previous card distributions to various recipient user(s) 102(2). When the style characteristic(s) 118 and/or contact information 114 of a previously distributed card are changed, an updated digital contact card 120 (including the updated style and/or contact information) may be sent to the previous recipient(s).

Figure 7:
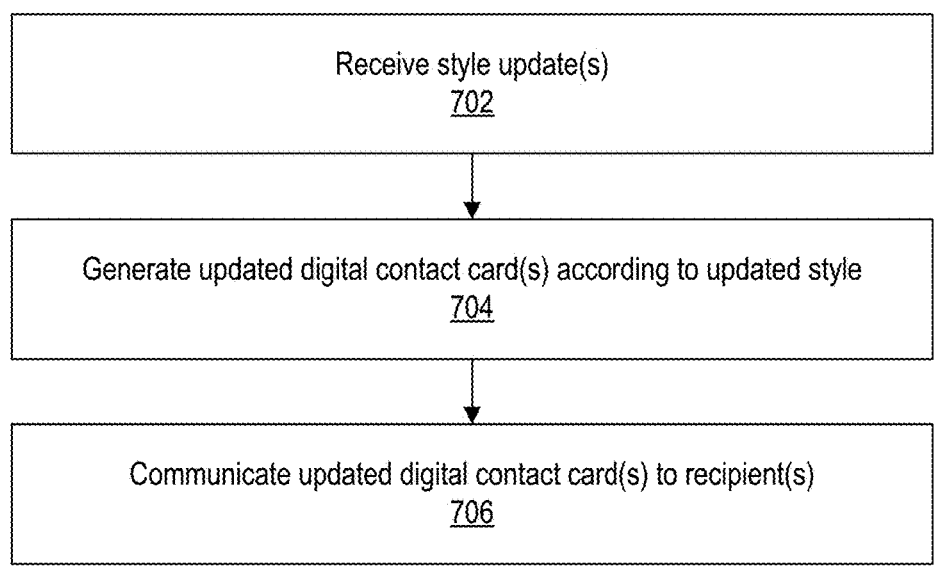
FIG. 7 depicts a flow diagram of an example process for managing style(s) and/or other aspects of digital cards, according to implementations of the present disclosure.

FIG. 7 depicts a flow diagram of an example process for managing style(s) and/or other aspects of digital cards, according to implementations of the present disclosure. Operations of the process may be performed by one or more of the user application 106, the digital contact card generation module(s) 112, the style management module(s) 122, and/or other software module(s) executing on the user device(s) 104, the card management platform 110, or elsewhere.

Style update(s) may be received (702). As described above, style update(s) for a particular organization may be provided by a user 102(3), such as a marketing professional for the organization. The style update(s) may be provided through the style management module(s) 122 and stored in the group style information 116. Digital contact card(s) 120 for one or more users 102(1) may be generated (704) to reflect the updated style information. The updated digital contact card(s) 120 may be communicated (706) to one or more recipient users 102(2).

In some implementations, the card management platform may provide functionality to enable an organization may impose constraints on card distribution in addition to defining the style of cards to be distributed. For example, an organization may determine which users 102(1) within the organization are permitted to distribute digital contact cards 120, such as users 102(1) with particular roles, titles, and so forth. The organization may also determine the types of recipient users 102(2) to whom cards may be distributed.

Figure 8:
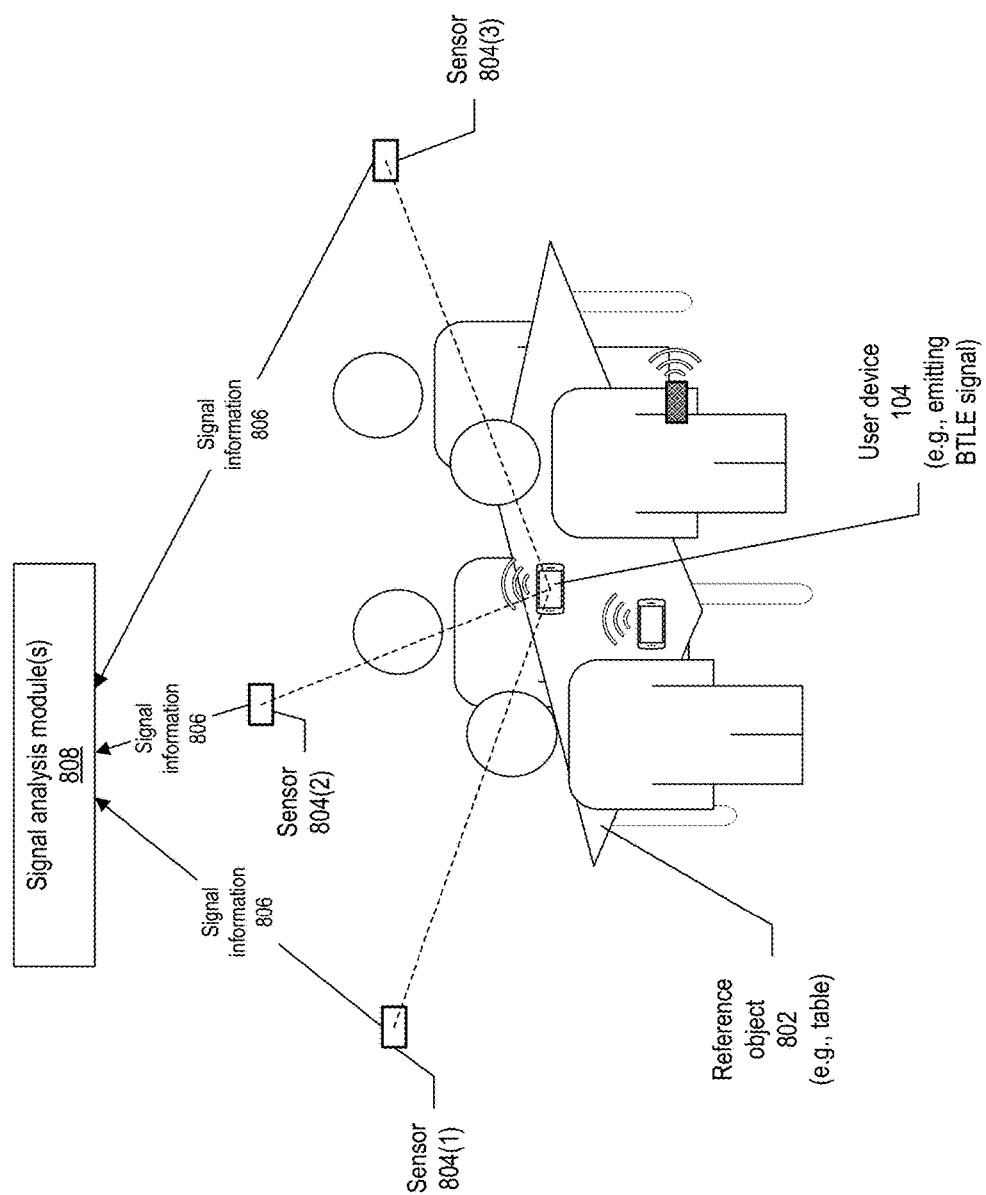
FIG. 8 depicts an example of an environment in which device location(s) may be determined, according to implementations of the present disclosure.

FIG. 8 depicts an example of an environment in which device location(s) may be determined, according to implementations of the present disclosure. In some implementations, the absolute and/or relative locations of multiple user devices 104 may be determined based on signals that are emitted from the user devices 104. In the example of FIG. 8, multiple users 102 are gathered around a reference object 802, such as a meeting room table. Each user 102 may have a user device 104. In some examples, the user devices 104 include portable computing devices such as the smartphones and/or wearable computers shown in FIG. 8. Each of the user devices 104 may include a transceiver that emits a signal. In some implementations, the signal is a radio-frequency signal. For example, the user devices 104 may each include a transceiver that emits a signal that conforms to a version of a radio frequency communication standard such as BlueTooth™, BlueTooth Low Energy™ (BTLE), Near Field Communications (NFC), Radio-Frequency Identification (RFID), and so forth.

The environment may include any appropriate number of sensors 804 that are arranged to detect the signals sent from the user devices 104. The sensor(s) 804 may determine a direction and/or strength of each detected signal, and communicate signal information 806 that describes the signal strength and/or direction to one or more signal analysis modules 808 executing on the card management platform 110 or other service. Based on the signal information 806, the signal analysis module(s) 808 may determine a location of each of the signal-transmitting user devices 104.

For example, as shown in FIG. 8, the signal (shown as a dashed line) from particular user device 104 is detected by multiple sensors 804(1), 804(2), and 804(3). Each of the sensors 804 may measure a strength (e.g., power) of the detected signal and/or a direction of the signal. Based on the strength and/or direction of the signal at each of the sensors 804, the signal analysis module(s) 808 may employ signal triangulation techniques to determine a position of the user device 104 relative to the known positions of each of the sensors 804. In some implementations, the signal analysis module(s) 808 may also detect a position of the reference object 802, or access information that describes the position of the reference object 802 (e.g., for a fixed reference object). In such instances, the signal analysis module(s) 808 may determine the position of the user device(s) 104 relative to the reference object 802. For example, the reference object 802 may be a table in a conference room, the signal analysis module(s) 808 may determine a location of each of the user device(s) 104 around the table. In some instances, the reference object 802 may be a particular user device 104, such as a user device 104 of a user 102 who may wish to send digital contact cards 120 to other users 102 around the table. The sensor(s) 804 may also be employed to determine a shape or layout of a room or other area.

In some implementations, the user device(s) 104 may also be configured to detect signals sent from other user device(s) 104, and various user device(s) 104 may therefore act as sensor(s). In this way, implementations may employ a mesh network of nodes to determine the position(s) of the various user device(s) 104 and/or user(s) 102 in an environment, in which a node may be an emitter of a signal, a detector of a signal, or both an emitter and a detector.

Figures 9A, 9B:
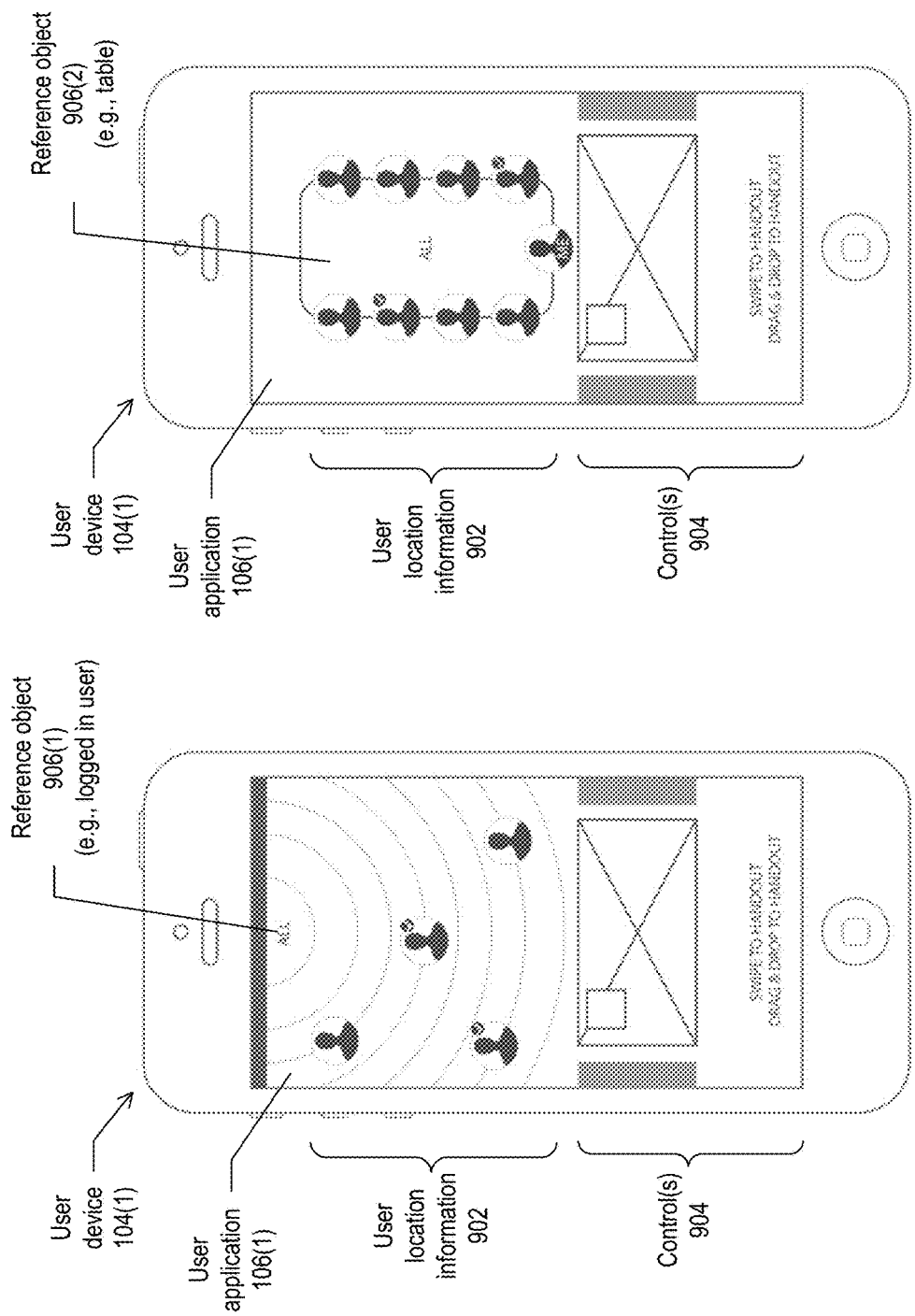
FIGS. 9A and 9B depict an example user interface for presenting device location information and distributing digital cards, according to implementations of the present disclosure.

FIGS. 9A and 9B depict an example UI for presenting device location information and distributing digital contact cards 120, according to implementations of the present disclosure. The UI may be presented through a user application 106. In the examples of FIGS. 9A and 9B, the positions of various user devices 104 have been determined through signal analysis as described with reference to FIG. 8, and the UI is presenting locations of users 102 of the user devices 104 based on the determined device positions.

In FIG. 9A, the user location information 902 is presented in the UI, showing the location of users 102 such as possible card recipient(s). The user locations may be shown relative to a reference object 906(1). In this example, the reference object 906(1) may be the current position of the user 102(1) who is currently logged in to the user application 106 and viewing the UI, and the user location information 902 may depict the distance and direction of each detected user relative to the user 102(1). The user location information 902 may also include other information regarding each detected user, such as the user's name, title, organizational affiliation (e.g., company), an image of the user's face, and so forth.

The user 102(1) may select one or more of the detected users shown in the user location information 902, to designate the selected users as card recipients. The user 102(1) may employ one or more controls 904 to cause a card distribution request 108 to be sent, requesting that a digital contact card 120 for the user 102(1) be sent to the selected user(s) 102(2) as described above.

In the example of FIG. 9B, the user location information 902 shows the locations of the detected users relative to a reference object 906(2) such a table. For example, the user location information 902 may show the various locations of the users seated around a conference table, relative to the user 102(1) currently viewing the UI (e.g., indicated as "Me" in the figure). The user 102(1) may select one or more of the detected users shown in the user location information 902 to designate the selected users as card recipients. The user 102(1) may employ one or more controls 904 to cause a card distribution request 108 to be sent, requesting that a digital contact card 120 for the user 102(1) be sent to the selected user(s) 102(2) as described above.

In some implementations, if the user 102(1) has received a digital contact card from one or more of the other user(s) 102(2), the UI may display at least a portion of each received digital contact card in proximity to the associated user 102(2). The displayed portion(s) of digital contact card(s) may include a name, image, and/or organizational affiliation (e.g., company) of each of the user(s) 102(2) who has sent a digital contact card to the user 102(1). The presentation of at least a portion of the received digital contact card(s) may help the user 102(1) remember the identities and/or roles of each of the other users 102(2) during a meeting, conference, or other gathering.

Although the various example UIs described herein may depict particular types and arrangements of UI elements, implementations are not limited to these examples. The UIs may include any suitable number and type of UI elements, such as controls (e.g., buttons, lists, menus, radio buttons, sliders, etc.), text elements, graphics, images, audio, video, and so forth, and such elements may be arranged in any suitable arrangement in any appropriate number of windows, frames, pages, and so forth.

Figure 10:
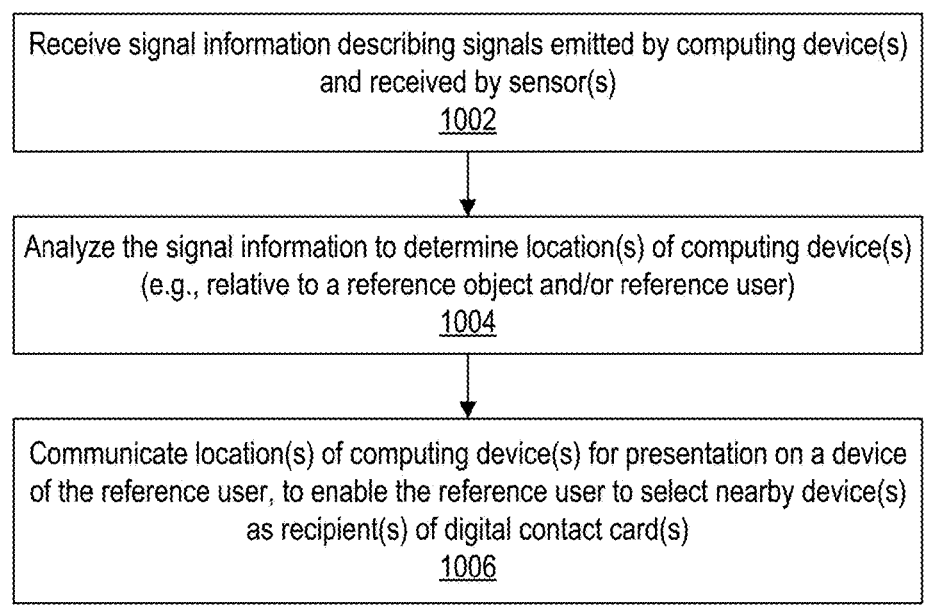
FIG. 10 depicts a flow diagram of an example process for determining device location(s), according to implementations of the present disclosure.

FIG. 10 depicts a flow diagram of an example process for determining device location(s), according to implementations of the present disclosure. Operations of the process may be performed by one or more of the user application 106, the digital contact card generation module(s) 112, the style management module(s) 122, the signal analysis module(s) 808, and/or other software module(s) executing on the user device(s) 104, the card management platform 110, or elsewhere.

The signal information 806 may be received (1002), describing the signal(s) emitted by user device(s) 104. As described above, the signal information 806 may describe the strength, direction, and or other characteristics of (e.g., radio-frequency) signals as detected at the sensor(s) 804.

The signal information 806 may be analyzed (1004) to determine the location(s) of the user device(s) 104 as described above. In some implementations, the location(s) may be determined relative to a reference object, such as a table or other object in a room with the emitting devices. In some examples, the reference object may be a reference user location, such as the location of the user 102(1) who may request a card distribution.

The location(s) of the user device(s) 104 may be communicated (1006) for presentation on the user device 104 of the user 102(1). As described above, the user 102(1) may use the information to determine who among of the detected users is to receive a digital contact card 120 for the user 102(1).

In some implementations, one or more of the user devices 104 can emit an indication that enables the user 102(1) of the user application 106 to determine the physical location of particular user device(s) 104 of other individuals in a room or other area. The indication may be emitted by the user device(s) 104 in addition to, or instead of, the (e.g., BTLE) signal emitted by the user device(s) 104. In some implementations, the indication is provided through an indicator component on the user device(s) 104. For example, the indicator component may be one or more LEDs on the user device(s) 104, and the indication can be a visual indication. The indicator component can emit a visual indication that is a particular color of light as a constant steady output, a flashing output for one or more flashes, or any appropriate sequence. The indicator component can emit one or more colors according to any suitable pattern or sequence. The indication may also be some other type of indication, such as an audio indication (e.g., sounds, music, etc.), a tactile or haptic indication (e.g., a vibration or other motion of a device or physical component), and so forth. The indication may also be a combination of visual, audio, tactile, and/or some other type of indication.

In some implementations, when a user 102(1) taps on or otherwise selects the icon of a particular individual shown in the user location information 902, the application 106 causes a signal to be sent to the user device 104 of the selected individual. The signal may include the unique identifier (e.g., UUID) of the user device 104 of the selected individual. In response to receiving the signal, the user device 104 corresponding to the unique identifier may indicate its presence visually or otherwise using the indicator component. In some implementations, the indicator component may flash one or more times, or emit a steady light, to indicate the user device's presence and enable the user to discern the physical location of the selected individual in the room or other area. In some implementations, the user device(s) 104 of the various individuals may be instructed to emit their indications without requiring the user 102(1) to select the icon(s) of the individual(s) through the user application 106. In some implementations, the icon(s) of the individual(s) in the user application 106 may include a color or other feature that corresponds to the indication(s) emitted by the user device(s) 104, to further enable the user 102 to associate the icon(s) in the user location information 902 with the correct corresponding individuals in the area.

In some implementations, the user 102(1) can drag and drop the icon of the selected individual to a particular location in the user location information 902 that indicates the particular physical location of the individual as discerned using the emitted indication(s), and thus arrange the icons of the individuals according to their physical locations. This feature helps the user 102(1) keep track of individuals' identities in the room or other area. In some implementations, different individuals in the room or other area may be indicated using different indications, such as different LEDs colors and/or different flashing patterns, different sounds, and so forth, to enable the user 102(1) to distinguish the physical locations of the various individuals and readily associate the different individuals with their particular icons in the user location information 902.

In some implementations, the various communications described herein may be encrypted, sent over secure connections, and/or otherwise secured to prevent unauthorized access to the communicated information. In instances where the collected user information is stored in persistent storage, access to the stored information may be restricted to authorized personnel associated with the card management service. The information may be stored in an encrypted form, and the data storage may be secured against unauthorized access. Implementations may provide enhanced data security with respect to the communication, storage, and other handling of data that includes personally identifiable information (PII) for users. Implementations may ensure data privacy by allowing users to opt in and give their permission for the collection and the various designated uses of their personal data by the card management service. At any time, users may opt out by withdrawing their permission for the collection and use of their data.

Figure 11:
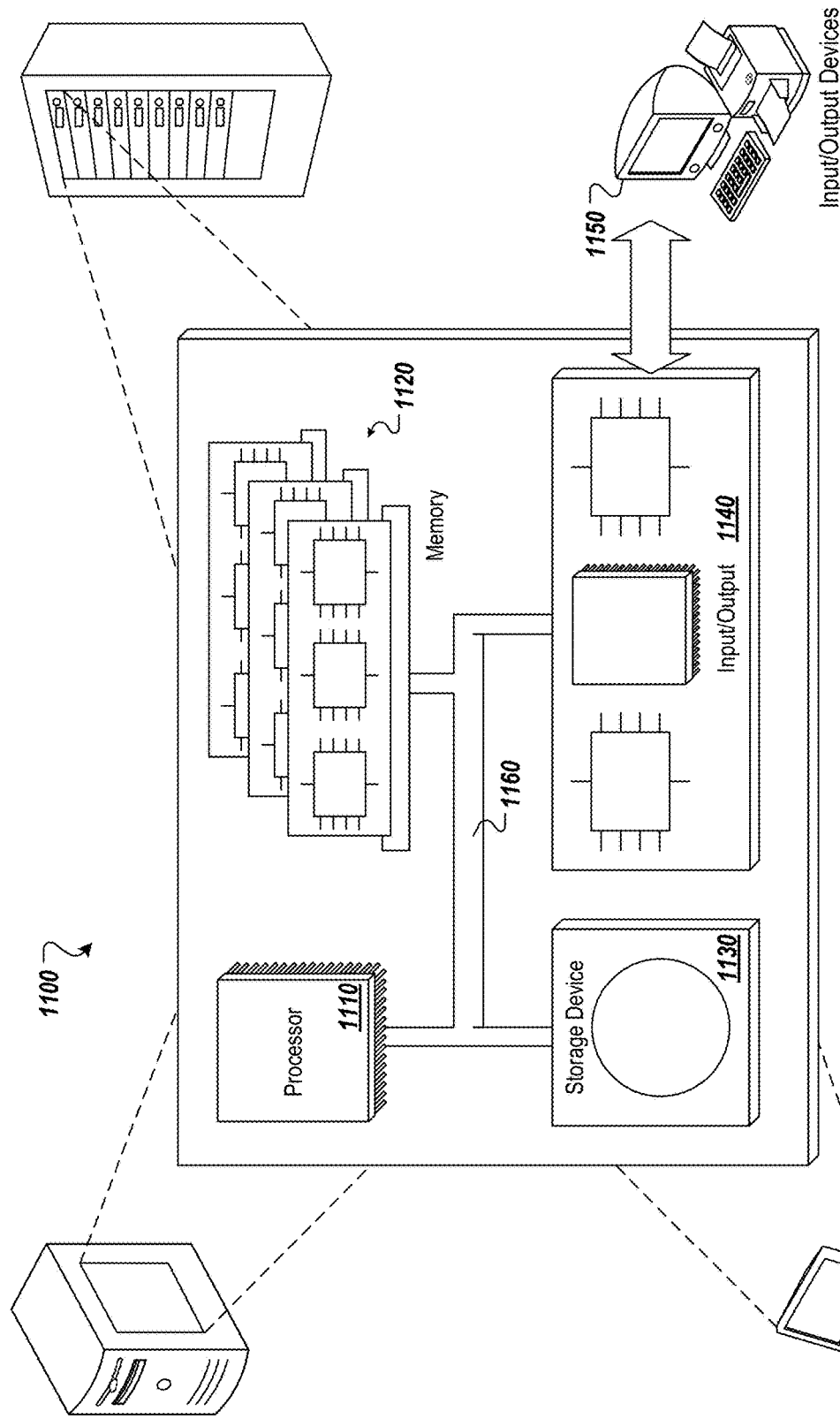
FIG. 11 depicts an example computing system, according to implementations of the present disclosure.

FIG. 11 depicts an example computing system, according to implementations of the present disclosure. The system 1100 may be used for any of the operations described with respect to the various implementations discussed herein. For example, the system 1100 may be included, at least in part, in one or more of the user device(s) 104, the card management platform 110, and/or other computing device(s) or system(s) described herein. The system 1100 may include one or more processors 1110, a memory 1120, one or more storage devices 1130, and one or more input/output (I/O) devices 1150 controllable through one or more I/O interfaces 1140. The various components 1110, 1120, 1130, 1140, or 1150 may be interconnected through at least one system bus 1160, which may enable the transfer of data between the various modules and components of the system 1100.

The processor(s) 1110 may be configured to process instructions for execution within the system 1100. The processor(s) 1110 may include single-threaded processor(s), multi-threaded processor(s), or both. The processor(s) 1110 may be configured to process instructions stored in the memory 1120 or on the storage device(s) 1130. The processor(s) 1110 may include hardware-based processor(s) each including one or more cores. The processor(s) 1110 may include general purpose processor(s), special purpose processor(s), or both.

The memory 1120 may store information within the system 1100. In some implementations, the memory 1120 includes one or more computer-readable media. The memory 1120 may include any number of volatile memory units, any number of non-volatile memory units, or both volatile and non-volatile memory units. The memory 1120 may include read-only memory, random access memory, or both. In some examples, the memory 1120 may be employed as active or physical memory by one or more executing software modules.

The storage device(s) 1130 may be configured to provide (e.g., persistent) mass storage for the system 1100. In some implementations, the storage device(s) 1130 may include one or more computer-readable media. For example, the storage device(s) 1130 may include a floppy disk device, a hard disk device, an optical disk device, or a tape device. The storage device(s) 1130 may include read-only memory, random access memory, or both. The storage device(s) 1130 may include one or more of an internal hard drive, an external hard drive, or a removable drive.

One or both of the memory 1120 or the storage device(s) 1130 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1100. In some implementations, the CRSM may include a data store that provides storage of computer-readable instructions or other information in a non-transitory format. The CRSM may be incorporated into the system 1100 or may be external with respect to the system 1100. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1110 and the memory 1120 may be supplemented by, or incorporated into, one or more application-specific integrated circuits (ASICs).

The system 1100 may include one or more I/O devices 1150. The I/O device(s) 1150 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1150 may also include one or more output devices such as a display, LED(s), an audio output device (e.g., a speaker), a printer, a haptic output device, and so forth. The I/O device(s) 1150 may be physically incorporated in one or more computing devices of the system 1100, or may be external with respect to one or more computing devices of the system 1100.

The system 1100 may include one or more I/O interfaces 1140 to enable components or modules of the system 1100 to control, interface with, or otherwise communicate with the I/O device(s) 1150. The I/O interface(s) 1140 may enable information to be transferred in or out of the system 1100, or between components of the system 1100, through serial communication, parallel communication, or other types of communication. For example, the I/O interface(s) 1140 may comply with a version of the RS-232 standard for serial ports, or with a version of the IEEE 1284 standard for parallel ports. As another example, the I/O interface(s) 1140 may be configured to provide a connection over Universal Serial Bus (USB) or Ethernet. In some examples, the I/O interface(s) 1140 may be configured to provide a serial connection that is compliant with a version of the IEEE 1394 standard.

The I/O interface(s) 1140 may also include one or more network interfaces, such as the network interface(s) 202, that enable communications between computing devices in the system 1100, or between the system 1100 and other network-connected computing systems. The network interface(s) may include one or more network interface controllers (NICs) or other types of transceiver devices configured to send and receive communications over one or more networks using any network protocol.

Computing devices of the system 1100 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1100 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or a combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube) or LCD (liquid crystal display) monitor) for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical UI or a web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for communicating digital contact cards, the method performed by at least one processor, and comprising:
  receiving, by the at least one processor, a card distribution request that is submitted by a first user through a card management user interface (UI), the card distribution request to communicate a digital contact card of the first user to at least one second user, wherein the at least one second user is selected through at least one of a schematic and a map that is presented in the card management UI and that shows a respective location of each of the at least one second user in proximity to the first user;
  in response to receiving the card distribution request:
    retrieving, by the at least one processor, contact information for the first user;
    retrieving, by the at least one processor, group style information that specifies at least one style characteristic to be used to generate the digital contact card, the group style information associated with an organization that includes the first user, the group style information having been specified for the organization by a third user through a style management UI, the group style information indicating a first portion of the contact information to be included in the digital contact card and a second portion of the contact information to be omitted from the digital contact card; and
    generating, by the at least one processor, the digital contact card including the at least one style characteristic specified in the group style information, the digital contact card including the first portion of the contact information for the first user;
  communicating, by the at least one processor, the digital contact card to at least one network address associated with a computing device of the at least one second user; and
  in response to determining a change to the group style information:
    automatically generating, by the at least one processor, an updated digital contact card according to the changed group style information; and
    communicating, by the at least one processor, the updated digital contact card to the at least one network address associated with the computing device of the at least one second user.

2. The method of claim 1, further comprising:
accessing, by the at least one processor, historical data that identifies previous recipients of the digital contact card of the first user; and
determining, by the at least one processor, the at least one second user to receive the updated digital contact card of the first user based on the historical data.

3. The method of claim 1, wherein the at least one style characteristic includes one or more of a font, a logo, a layout, a color scheme, and an organization name.

4. The method of claim 1, wherein the contact information includes one or more of a name, a title, a mailing address, a telephone number, an email address, a social network address, and a signature of the first user.

5. The method of claim 1, wherein the request indicates a selection of the digital contact card from a plurality of digital contact cards associated with the first user.

6. The method of claim 5, wherein each of the plurality of digital contact cards is associated with a respective group that includes the first user.

7. The method of claim 5, wherein each of the plurality of digital contact cards is associated with a respective set of style characteristics.

8. A system comprising:
at least one processor; and
a memory that is communicatively coupled to the at least one processor, the memory storing instructions which, when executed by the at least one processor, cause the at least one processor to perform operations comprising:
receiving a card distribution request that is submitted by a first user through a card management user interface (UI), the card distribution request to communicate a digital contact card of the first user to at least one second user, wherein the at least one second user is selected through at least one of a schematic and a map that is presented in the card management UI and that shows a respective location of each of the at least one second user in proximity to the first user;
in response to receiving the card distribution request:
retrieving, by the at least one processor, contact information for the first user;
retrieving group style information that specifies at least one style characteristic to be used to generate the digital contact card, the group style information associated with an organization that includes the first user, the group style information having been specified for the organization by a third user through a style management UI, the group style information indicating a first portion of the contact information to be included in the digital contact card and a second portion of the contact information to be omitted from the digital contact card; and
generating the digital contact card including the at least one style characteristic specified in the group style information, the digital contact card including the first portion of the contact information for the first user;
communicating the digital contact card to at least one network address associated with a computing device of the at least one second user; and
in response to determining a change to the group style information:
automatically generating an updated digital contact card according to the changed group style information; and
communicating the updated digital contact card to the at least one network address associated with the computing device of the at least one second user.

9. The system of claim 8, the operations further comprising:
accessing historical data that identifies previous recipients of the digital contact card of the first user; and
determining the at least one second user to receive the updated digital contact card of the first user based on the historical data.

10. The system of claim 8, wherein the at least one style characteristic includes one or more of a font, a logo, a layout, a color scheme, and an organization name.

11. The system of claim 8, wherein the contact information includes one or more of a name, a title, a mailing address, a telephone number, an email address, a social network address, and a signature of the first user.

12. The system of claim 8, wherein the request indicates a selection of the digital contact card from a plurality of digital contact cards associated with the first user.

13. The system of claim 12, wherein each of the plurality of digital contact cards is associated with a respective group that includes the first user.

14. The system of claim 12, wherein each of the plurality of digital contact cards is associated with a respective set of style characteristics.

15. One or more non-transitory computer-readable storage media storing instructions which, when executed by at least one processor, cause the at least one processor to perform operations comprising:
receiving a card distribution request that is submitted by a first user through a card management user interface (UI), the card distribution request to communicate a digital contact card of the first user to at least one second user, wherein the at least one second user is selected through at least one of a schematic and a map that is presented in the card management UI and that shows a respective location of each of the at least one second user in proximity to the first user;
in response to receiving the card distribution request:
retrieving contact information for the first user;
retrieving group style information that specifies at least one style characteristic to be used to generate the digital contact card, the group style information associated with an organization that includes the first user, the group style information having been specified for the organization by a third user through a style management UI, the group style information indicating a first portion of the contact information to be included in the digital contact card and a second portion of the contact information to be omitted from the digital contact card; and
generating the digital contact card including the at least one style characteristic specified in the group style information, the digital contact card including the first portion of the contact information for the first user;
communicating the digital contact card to at least one network address associated with a computing device of the at least one second user; and
in response to determining a change to the group style information:

automatically generating an updated digital contact card according to the changed group style information; and communicating the updated digital contact card to the at least one network address associated with the computing device of the at least one second user.

16. The one or more non-transitory computer-readable storage media of claim 15, the operations further comprising:

accessing historical data that identifies previous recipients of the digital contact card of the first user; and determining the at least one second user to receive the updated digital contact card of the first user based on the historical data.

17. The one or more non-transitory computer-readable storage media of claim 15, wherein the at least one style characteristic includes one or more of a font, a logo, a layout, a color scheme, and an organization name.

18. The one or more non-transitory computer-readable storage media of claim 15, wherein the contact information includes one or more of a name, a title, a mailing address, a telephone number, an email address, a social network address, and a signature of the first user.

19. The one or more non-transitory computer-readable storage media of claim 15, wherein:

the request indicates a selection of the digital contact card from a plurality of digital contact cards associated with the first user; and each of the plurality of digital contact cards is associated with a respective set of style characteristics.

20. The one or more non-transitory computer-readable storage media of claim 19, wherein each of the plurality of digital contact cards is associated with a respective group that includes the first user and that is associated with the respective set of style characteristics.

* * * * *